United States Patent
Schat

(10) Patent No.: US 11,586,728 B2
(45) Date of Patent: Feb. 21, 2023

(54) METHODS FOR DETECTING SYSTEM-LEVEL TROJANS AND AN INTEGRATED CIRCUIT DEVICE WITH SYSTEM-LEVEL TROJAN DETECTION

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 765 days.

(21) Appl. No.: 16/435,421

(22) Filed: Jun. 7, 2019

(65) Prior Publication Data
US 2020/0387601 A1    Dec. 10, 2020

(51) Int. Cl.
| | |
|---|---|
| *G06F 21/55* | (2013.01) |
| *G06N 20/00* | (2019.01) |
| *G06F 11/30* | (2006.01) |

(52) U.S. Cl.
CPC ........ *G06F 21/552* (2013.01); *G06F 11/3027* (2013.01); *G06F 11/3051* (2013.01); *G06N 20/00* (2019.01); *G06F 2221/034* (2013.01)

(58) Field of Classification Search
CPC .................................................. G06F 21/552
See application file for complete search history.

(56) References Cited

U.S. PATENT DOCUMENTS

| | | | |
|---|---|---|---|
| 9,491,142 B2 | 11/2016 | Xie et al. | |
| 9,661,009 B1 * | 5/2017 | Karandikar | ......... H04L 63/1433 |
| 9,710,648 B2 | 7/2017 | Weingarten et al. | |
| 11,073,362 B1 * | 7/2021 | Barnawi | ................. F41H 11/02 |
| 2002/0133721 A1 | 9/2002 | Adjaoute | |
| 2014/0108786 A1 * | 4/2014 | Kreft | ..................... G06F 21/335 |
| | | | 713/194 |
| 2017/0153988 A1 * | 6/2017 | Panesar | ............... G06F 12/1416 |
| 2018/0262327 A1 * | 9/2018 | Jain | ......................... H04L 9/088 |
| 2019/0068620 A1 * | 2/2019 | Avrahami | ........... H04L 63/1441 |
| 2019/0310310 A1 * | 10/2019 | Tart | .................... G05B 19/4185 |

FOREIGN PATENT DOCUMENTS

CN     102662144 A     9/2012

OTHER PUBLICATIONS

Ghosh, Swaroop et al. "How Secure Are Printed Circuit Boards Against Trojan Attacks?", IEEE, 10 pages, Mar./Apr. 2015.
(Continued)

*Primary Examiner* — Simon P Kanaan

(57) ABSTRACT

Embodiments of a method, an IC device, and a circuit board are disclosed. In an embodiment, the method involves at an IC device of the system, monitoring activity on a bus interface of the IC device, wherein the bus interface is connected to a bus on the system that communicatively couples the IC device to at least one other IC device on the system, applying machine learning to data corresponding to the monitored activity to generate an activity profile, monitoring subsequent activity on the bus interface of the IC device, comparing data corresponding to the to subsequently monitored activity to the machine learning generated activity profile to determine if a system-level Trojan is detected, and generating a notification when it is determined from the comparison that a system-level Trojan has been detected.

12 Claims, 6 Drawing Sheets

(56) References Cited

OTHER PUBLICATIONS

Hennessy, Andrew et al. "JTAG-Based Robust PCB Authentication for Protection Against Counterfeiting Attacks", 21st Asia and South Pacific Design Automation Conference (ASP-DAC), pp. 56-61 (2016).

Bloomberg Business Week, "The Big Hack: How China Used a Tiny Chip to infiltrate U.S. Companies", https://www.bloomberg.com/news/features/2018-10-04/the-big-hack-how-china-used-a-tiny-chip-to-infiltrate-america-s-top-companies, 14 pages, Oct. 4, 2018.

2018 Global Cyber Attack Trends Report, online at https://research.checkpoint.com/wp-content/uploads/2018/07/Cyber-Attack-Trends-2018-Mid-Year-Report.pdf, 35 pages (2018).

"Method for Triggering and Detecting a Malicious Circuit in an Integrated Circuit Device", Utility U.S. Appl. No. 15/950,207, filed Apr. 11, 2018.

Mukhopadhysy, Indraneel et al. "Heuristic Intrusion Detection and Prevention System", 2015 International Conference and Workshop on Computing and Communication (IEMCON), pp. 1-7 (2015).

Mingfu, Xue et al. "Detecting Hardware Trojan Through Heuristic Partition and Activity Driven Test Pattern Generation", Communications Security Conference, 6 pages (2014).

Inoue, Tomotaka et al. "Designing Hardware Trojans and Their Detection based on a SVM-based Approach", published in 2017 IEEE 12th International Conference on ASIC (ASICON), pp. 811 814 (2017).

Hasegawa, Kento et al. "A Hardware-Trojan Classification Method Utilizing Boundary Net Structures", 2018 IEEE International Conference on Consumer Electronics (ICCE), 4 pages (2018).

Kulkarni, Amey et al. "Adaptive Real-time Trojan Detection Framework through Machine Learning", 2016 IEEE International Symposium on Hardware Oriented Security and Trust (HOST), p. 120-123 (2016).

SMC XBOX, "The JTAG/SMC Hack" https://github.com/Free60Project/wiki/blob/master/SMC_Hack.md, retrieved from the internet, https://armaid.com/, on Jun. 3, 2019, 10 pgs..

De Rolt, Jean et al. "Test versus security—Past and Present", IEEE Transactions on Emerging Topics in Computing, vol. 2, No. 1, p. 60-62, Mar. 2014.

Breeuwsma, M.F. et al. "Forensic imaging of embedded systems using JTAG (boundary-scan)", Digital Investigation 3, p. 32-42 (2006).

Wang, Tong et al. "A Novel Method of Image Categorization and Retrieval based on the Combination of Visual and Semantic Features", Proceedings of the Fourth International Conference on Machine Learning and Cybernetics, Guangzhou, p. 5279-5283, Aug. 18-21, 2005.

Zhao, Jingling et al. "Malware Detection Using Machine Learning Based on the Combination of Dynamic and Static Features", 2018 27th International Conference on Computer Communication and Networks (ICCCN), 6 pages (2018).

Fern, Nicole et al. "Pre-silicon Formal Verification of JTAG Instruction Opcodes for Security", IEEE International Test Conference, 9 pgs. (2018).

\* cited by examiner

METHODS FOR DETECTING SYSTEM-LEVEL TROJANS AND AN INTEGRATED CIRCUIT DEVICE WITH SYSTEM-LEVEL TROJAN DETECTION

BACKGROUND

Various security threats exist at the integrated circuit (IC)-level of IC devices. For example, IC-level Trojans may be configured to implement malicious actions including: 1) leaking confidential information and secret keys covertly to an adversary (e.g., a confidentiality attack); 2) changing the value of a certain register in the IC device (e.g., an integrity attack); and 3) disabling, deranging, or destroying the entire hardware or components of the IC device (e.g., availability attack).

Some measures have been identified to counteract IC-level Trojans. Although measures may be implemented to counteract IC-level Trojans, once an IC device is integrated into a broader system, such as once the IC device is attached to a circuit board (e.g., a printed circuit board (PCB)) that includes multiple IC devices connected by a bus, the IC device may be vulnerable to a Trojan that is on another IC device on the PCB, referred to herein as system-level Trojans.

System-level Trojans are a relatively new and growing threat that can come in many forms and that may enter the system (e.g., a PCB) at different points in the supply chain, including, for example, an IC device being surreptitiously attached to a PCB during PCB assembly or distribution to unleash a system-level Trojan, an uncompromised IC device (e.g., a genuine IC device) that is replaced on a PCB by a compromised IC device (e.g., a counterfeit IC device that carries a system-level Trojan) during PCB assembly or distribution, and/or an IC device that is compromised with a system-level Trojan during manufacturing or after manufacturing but before being attached to the PCB. Thus, although measures have been identified to counteract IC-level Trojans, there is still a need to address system-level Trojans that may enter a system (e.g., a PCB) at any point in the supply chain.

SUMMARY

Embodiments of a method, an integrated circuit (IC) device, and a circuit board are disclosed. In an embodiment, the method involves at an IC device of the system, monitoring activity on a bus interface of the IC device, wherein the bus interface is connected to a bus on the system that communicatively couples the IC device to at least one other IC device on the system, at the IC device of the system, applying machine learning to data corresponding to the monitored activity to generate an activity profile, at the IC device of the system, monitoring subsequent activity on the bus interface of the IC device, at the IC device of the system, comparing data corresponding to the subsequently monitored activity to the machine learning generated activity profile to determine if a system-level Trojan is detected, and at the IC device of the system, generating a notification when it is determined from the comparison that a system-level Trojan has been detected.

In an embodiment, monitoring activity and monitoring subsequent activity on the bus interface of the IC device involves monitoring activity on a JTAG interface of the IC device.

In an embodiment, monitoring activity and monitoring subsequent activity on the bus interface of the IC device involves monitoring timing behavior of signals at the bus interface.

In an embodiment, monitoring activity and monitoring subsequent activity on the bus interface of the IC device involves measuring propagation delay of signals from the IC device to another IC device through a bus on a printed circuit board, wherein the propagation delay measurement is based on a boundary scan.

In an embodiment, monitoring activity and monitoring subsequent activity on the bus interface of the IC device involves port scanning on a logical port.

In an embodiment, monitoring activity and monitoring subsequent activity on the bus interface of the IC device involves port scanning on a physical port.

In an embodiment, the method involves applying statistical analysis to the data corresponding to the monitored activity and to the data corresponding to the subsequently monitored activity.

In an embodiment, the statistical analysis involves statistical analysis related to at least one of latency, size, and workload of data packets.

In an embodiment, the statistical analysis involves generating histograms related to at least one of a time interval between two memory accesses, a difference in addresses of memories that are accessed, and a difference in data that is read or written.

In an embodiment, applying machine learning involves implementing a netlist-based simulation.

In an embodiment, applying machine learning involves implementing feature extraction on the data corresponding to the monitored activity and on the data corresponding to the subsequently monitored activity.

In an embodiment, monitoring activity on the bus interface of the IC device involves monitoring activity on the bus interface of the IC device before the IC device has been deployed for its intended use and after the IC device has been deployed for its intended use, and applying machine learning to data corresponding to the monitored activity to generate an activity profile involves applying machine learning to data generated from the pre-deployment activity monitoring and applying machine learning to data generated from the post-deployment activity monitoring.

In an embodiment, determining if a system-level Trojan has been detected involves applying a detection threshold to an output of the comparison.

In another embodiment, an IC device includes a bus interface, a processor and memory that stores computer readable instructions, which when executed by the processor and memory circuit, implements, monitoring activity on the bus interface of the IC device, wherein the bus interface is connectable to a bus on a system that communicatively couples the IC device to at least one other IC device on the system, applying machine learning to data corresponding to the monitored activity to generate an activity profile, monitoring subsequent activity on the bus interface of the IC device, comparing data corresponding to the subsequently monitored activity to the machine learning generated activity profile to determine if a system-level Trojan is detected, and generating a notification when it is determined from the comparison that a system-level Trojan has been detected.

In an embodiment of the IC device, monitoring activity and monitoring subsequent activity on the bus interface of the IC device involves monitoring timing behavior of signals at the bus interface.

In an embodiment of the IC device, monitoring activity and monitoring subsequent activity on the bus interface of the IC device involves port scanning on at least one of a logical port and a physical port.

In an embodiment of the IC device, wherein the computer readable instructions, which when executed by the processor and memory circuit, implement applying statistical analysis to the data corresponding to the monitored activity and to the data corresponding to the subsequently monitored activity.

In an embodiment of the IC device, the statistical analysis involves generating a histogram.

In an embodiment of the IC device, determining if a system-level Trojan has been detected involves applying a detection threshold to an output of the comparison.

In another embodiment, a circuit board includes a bus, multiple integrated circuit (IC) devices attached to the circuit board and communicatively coupled to the bus. A first IC device includes a processor and memory circuit that stores computer readable instructions, which when executed by the processor and memory circuit, implements monitoring activity on a bus interface of the first IC device, wherein the bus interface is connected to the bus, applying machine learning to data corresponding to the monitored activity to generate an activity profile, monitoring subsequent activity on the bus interface of the first IC device, comparing data corresponding to the subsequently monitored activity to the machine learning generated activity profile to determine if a system-level Trojan is detected, and generating a notification when it is determined from the comparison that at system-level Trojan has been detected.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
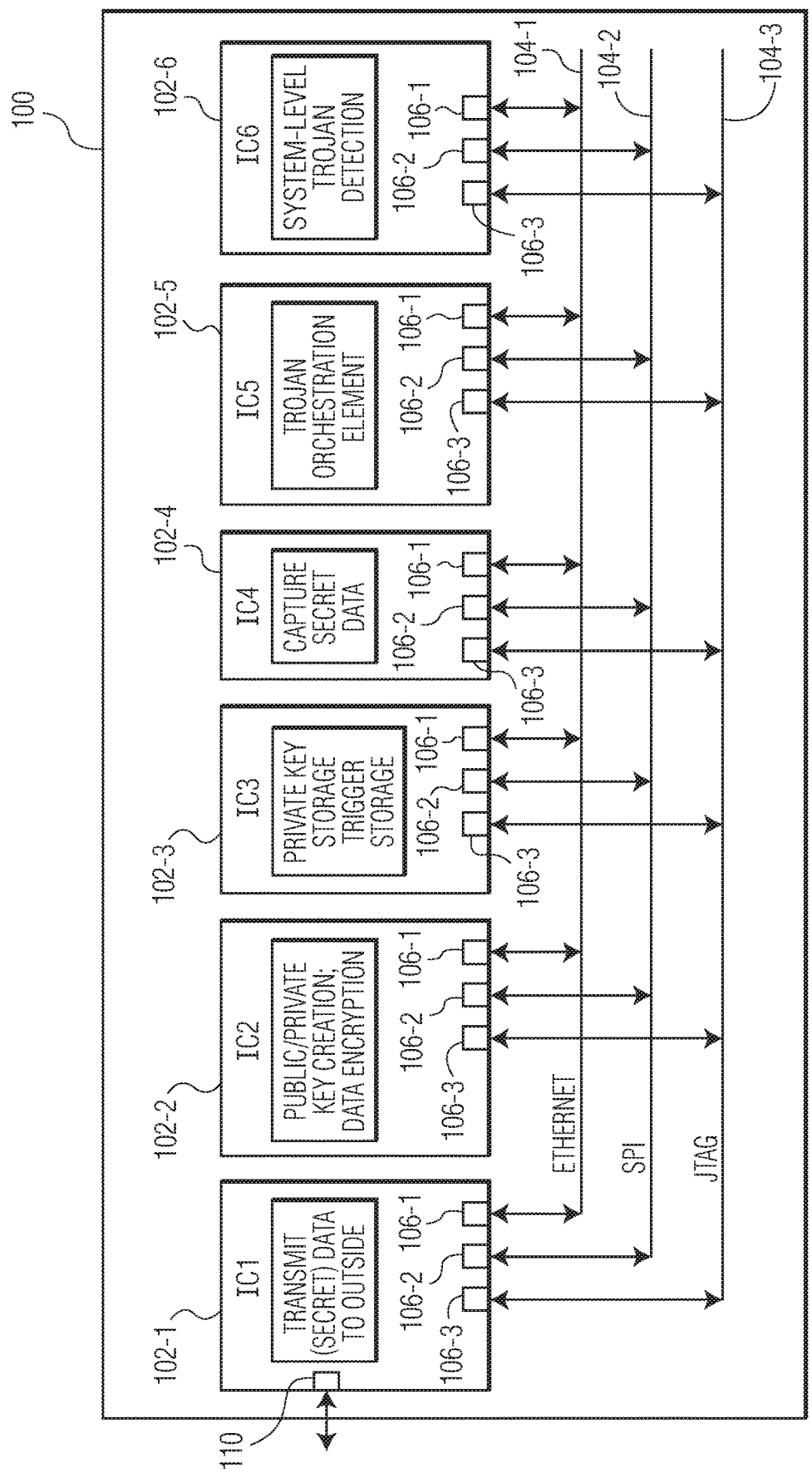
FIG. 1 depicts an example of a system in the form of a PCB that includes several separate and distinct IC devices that are connected by buses.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

IC-level Trojans may be introduced as hidden "front-doors" that are maliciously inserted while designing an IC, by using a pre-made Intellectual Property (IP) core that may have been purchased from a non-reputable source, or inserted internally by a rogue employee, either acting on their own, or on behalf of rogue special interest groups, or state sponsored spying, espionage, and/or sabotage. A hardware Trojan on a specific IC device typically involves malicious modifications to the circuitry of the IC device. A hardware Trojan on a particular IC device (also referred to herein as an "IC-level Trojan") may be characterized by the physical representation of the Trojan on the IC device and/or by the actions that are implemented by the Trojan. Measures that have been taken to prevent and/or counteract IC-level Trojans include securing device supply chains, verification of fabricated IC devices before deployment into the field, and/or validation of the IC devices after deployment into the field.

Measures to address IC-level Trojans are typically focused on the operation of the IC device itself. In contrast to IC-level Trojans, system-level Trojans utilize resources from multiple IC devices on a system (e.g., on a PCB) to implement some malicious activity. System-level Trojans may find their way into a system (e.g., a PCB) in various different ways, including, for example, by an IC device being surreptitiously attached to a PCB during PCB assembly or distribution to unleash a system-level Trojan, by an uncompromised IC device (e.g., a genuine IC device) that is replaced on a PCB by a compromised IC device (e.g., a counterfeit IC device that carries a system-level Trojan) during PCB assembly or distribution, and/or by an IC device that is compromised with a system-level Trojan during manufacturing or after manufacturing but before being attached to the PCB.

The functionality required to fully enable a system-level Trojan is by definition distributed over several IC devices on a PCB. For example, a system-level Trojan can be enabled using the functionality of multiple IC devices on a PCB, where the functionality used on some of the IC devices is harmless within the context of the IC device on which the functionality is implemented, and hence can escape detection during verification, validation, and/or production test. For example, it can be hard to detect a system-level Trojan when functions of certain IC devices are being used for their intended purpose (e.g., key storage and/or off-PCB communication) without modifying the respective IC device.

There are a number of common features between IC-level Trojans and system-level Trojans. For example, both IC-level Trojans and system-level Trojans typically have a delayed activation/trigger to escape detection during verification, production test, and validation and both IC-level Trojans and system-level Trojans are assumed to have a "payload" that performs actions such as leaking secret data, ransom attacks, hidden crypto-currency mining, or being part of a botnet, e.g., for use in a distributed denial-of-service (DoS) attack.

Along with the similarities, there are also distinct differences between IC-level Trojans and system-level Trojans that can present unique challenges with regard to detecting system-level Trojans. For example, with respect to detection of IC-level Trojans, the detection mechanism typically has access to all components within the IC device (e.g., ROM, RAM, registers, input/output (I/O) interfaces, processors, etc.). However, with respect to detection of system-level Trojans, access to internal components of some of the IC devices (e.g., ROM, registers, etc.) is managed thru dedicated interfaces between the IC devices, and hence access to such components can be restricted in several ways. Additionally, IC-level Trojans are typically single entities, which can be detected as malicious by observing input and output data streams on internal paths within the IC device. However, because system-level Trojans rely on multiple components of the system (e.g., the PCB) to implement malicious activity, some of which by themselves are not malicious, even observing inputs and outputs from some components of the system may not necessarily help to detect that the component is compromised as part of a system-level Trojan. A system-level Trojan may (at least partly) be reliant on an additional IC device that is surreptitiously mounted on a PCB for the sole purpose of facilitating the malicious activity of the Trojan and the detection mechanism may have no information about the IC device. Additionally, system-level Trojans may (at least partly) be reliant on counterfeit versions of IC devices that somehow find their way onto the PCB, in which case the Trojans have many ways in which they can deploy, hide, and obfuscate the components that implement the system-level Trojans on such IC devices.

FIG. 1 depicts an example of a system in the form of a PCB 100 that includes several separate and distinct IC devices 102-1-102-6 that are connected by buses 104-1-104-3. For example, all of the IC devices are physically attached to the same PCB and communicatively coupled by buses, including, for example, an Ethernet bus, a Serial Peripheral Interface (SPI) bus, and a Joint Test Action Group (JTAG) bus. In the example depicted in FIG. 1, each IC device has a different function that enables the PCB to perform certain desired functions. For example, the first IC device (IC1) 102-1 is configured to transmit data off of the PCB and to receive data onto the PCB via, for example, a wired or wireless interface, the second IC device (IC2) 102-2 is configured to create public and/or private encryption keys and to perform data encryption, the third IC device (IC3) 102-3 is configured to store encryption keys, such as a private encryption key, in memory (e.g., volatile and/or non-volatile memory), the fourth IC device (IC4) 102-4 is configured to capture secret data (e.g., user passwords, encryption keys used for authentication), the fifth IC device (IC5) 102-5 is configured to perform some legitimate function of the PCB but in the example has been compromised by a Trojan (e.g., a hardware Trojan that involves circuits intended to perform a malicious activity) or the fifth IC device was surreptitiously placed on the PCB with the specific purpose of orchestrating a system-level Trojan, and the sixth IC device (IC6) 102-6 is configured to perform some legitimate function of the PCB and, as is explained in more detail below, is also configured to detect system-level Trojans. As depicted in FIG. 1, each IC device has a bus interface 106-1-106-3 that is configured to support communications on the corresponding bus, e.g., 104-1-104-3. The bus interfaces may include conductive pins or leads on the IC devices that are electrically connected to the respective buses as is known in the field. Although Ethernet, SPI, and JTAG buses are depicted, other buses are possible. Additionally, although each of the six IC devices 102-1-102-6 is connected to each of the three buses 104-1-104-3, in other embodiments, the IC devices may not all be connected to every bus.

As an example, the PCB 100 depicted in FIG. 1 may be compromised in a way that is not obviously suspicious, at least because operations performed by some of the IC devices 102-1-102-6 in support of the system-level Trojan may not necessarily be suspicious with respect to the particular functions performed by the particular IC device (e.g., the first IC device (IC1) performs the function of transmitting data and is unaware of the content and/or context of the data), but the overall malicious activity is accomplished by functions performed by more than one of the IC devices in concert. An example operation of such a system-level Trojan is now described with reference to FIG. 1.

Referring to FIG. 1, it is assumed that a Trojan (e.g., an IC-level Trojan) is embedded into the circuits of the fifth IC device (IC5) 102-5 and that the fifth IC device (IC5) orchestrates malicious activity that is carried out via the fifth IC device with the help of the first through fourth IC devices (IC1-IC4) 102-1-102-4 on the PCB 100. Also, it is assumed that the sixth IC device (IC6) 102-6 is at least configured to detect system-level Trojans.

In the example of FIG. 1, the first IC device (IC1) 102-1 may contribute to the implementation of malicious activity by the system-level Trojan by, for example, providing an interface 110 to transmit data to and/or from the PCB 100. The second IC device (IC2) 102-2 may contribute to the implementation of malicious activity by the system-level Trojan by, for example, encrypting a data stream that is carried on one of the buses of the PCB. The encrypted data stream may be transmitted off of the PCB via the first IC device (IC1) or stored on the PCB in one of the IC devices and, for example, held for ransom in the encrypted form. The third IC device (IC3) may contribute to the implementation of malicious activity by the system-level Trojan by, for example, storing a secret key (e.g., a private key created and used by the second IC device (IC2)) and/or by storing a data word that indicates whether a delayed trigger of the system-level Trojan has been activated. The fourth IC device (IC4) 102-4 may contribute to the implementation of malicious activity by the system-level Trojan by, for example, allowing secret data (e.g., passwords, encryption keys, and/or authentication tokens) to be accessed from the IC device and sent out onto a bus of the PCB and shared with another IC device and/or transmitted off the PCB. The fifth IC device (IC5) 102-5 may be an IC device that carries a part of the system-level Trojan as a hardware modification of the IC device. The hardware modification of the IC device causes the IC device to control the other IC devices (e.g., IC1, IC2, IC3, and IC4) to capture, encrypt, and leak secret data off of the PCB.

Some techniques for providing a first line of defense to prevent system-level Trojans from gaining a foothold in a system such as a PCB include, for example, securing the supply chain associated with procurement of third-party IC devices and third-party Intellectual Property (IP) blocks, securing the facilities at which IC devices and/or PCBs are designed, utilizing secure and certified Electronic Design Automation (EDA) tools for IC device and PCB layout and verification, securing wafer fabrication facilities and PCB assembly facilities, and implementing detailed hardware source code reviews. Although the above-mentioned precautions can help to prevent system-level Trojans from ever gaining a foothold in a system, system-level Trojans may still find their way into systems. It is thus desirable to have another line of defense against system-level Trojans that involves detecting the existence of system-level Trojans wherever the system-level Trojans may present themselves, e.g., in a pre-deployment stage that may include verification, validation, and/or testing or in a post-deployment stage that may include while the system is being used for its intended purpose.

As noted above, a system-level Trojan may gain a foothold on a system such as a PCB in many different ways and at many different points along the supply chain from IC device fabrication to deployment in the field as an end product. Additionally, the particular malicious activities implemented by a system-level Trojan can vary widely from device-to-device on the PCB. In view of the above-mentioned obstacles to system-level Trojan detection (e.g., limited access to the interior components of IC devices, functionality of the system-level Trojan distributed amongst non-suspicious IC devices, and the possibility of surreptitiously adding Trojan-carrying IC devices on the PCB), it has been realized that system-level Trojans can be detected by observing the data traffic at the bus interface of an IC device that is connected to other IC devices on a PCB.

In accordance with an embodiment of the invention a technique for detecting a system-level Trojan on a system such as a PCB involves monitoring activity on the bus interface of an IC device, wherein the bus interface is connectable to a bus on the PCB that communicatively couples the IC device to at least one other IC device on the PCB, applying machine learning to data corresponding to the monitored activity to generate an activity profile, monitoring subsequent activity on the bus interface of the IC device, comparing data corresponding to the subsequently monitored activity to the machine learning generated activity profile to determine if a system-level Trojan is detected, and generating a notification when it is determined from the comparison that a system-level Trojan has been detected.

In an embodiment, the technique for detecting system-level Trojans involves implementing machine learning to generate activity profiles that indicate the presence (or likelihood of presence to some degree) of system-level Trojans. Various aspects of machine learning are described herein. In an embodiment, machine learning techniques are applied at multiple different stages of the PCB lifecycle and are combined to generate a library of activity profiles that can detect the presence of system-level Trojans to a high degree of confidence. For example, generating a library of activity profiles that indicate the presence of system-level Trojans may involve: 1) machine learning based on observation and modification of activity on the bus of a PCB during pre-deployment validation; 2) machine learning based on netlist simulations, including models of assumed system-level Trojans; 3) machine learning based on observation of activity on a bus of the PCB in post-deployment operations; and 4) a combination of the data acquired during machine learning in the pre-deployment stage and machine learning in the post-deployment stage. The technique for detecting system-level Trojans as described herein is flexible enough to be able to detect a wide variety of system-level Trojans that can be implemented via a variety of IC devices on a PCB. Additionally, through continued monitoring and machine learning throughout the lifecycle of the PCB, the technique can dynamically adapt to detect system-level Trojans that were previously unknown or that may not have even been developed at the time the PCB was deployed into the field.

Figure 2:
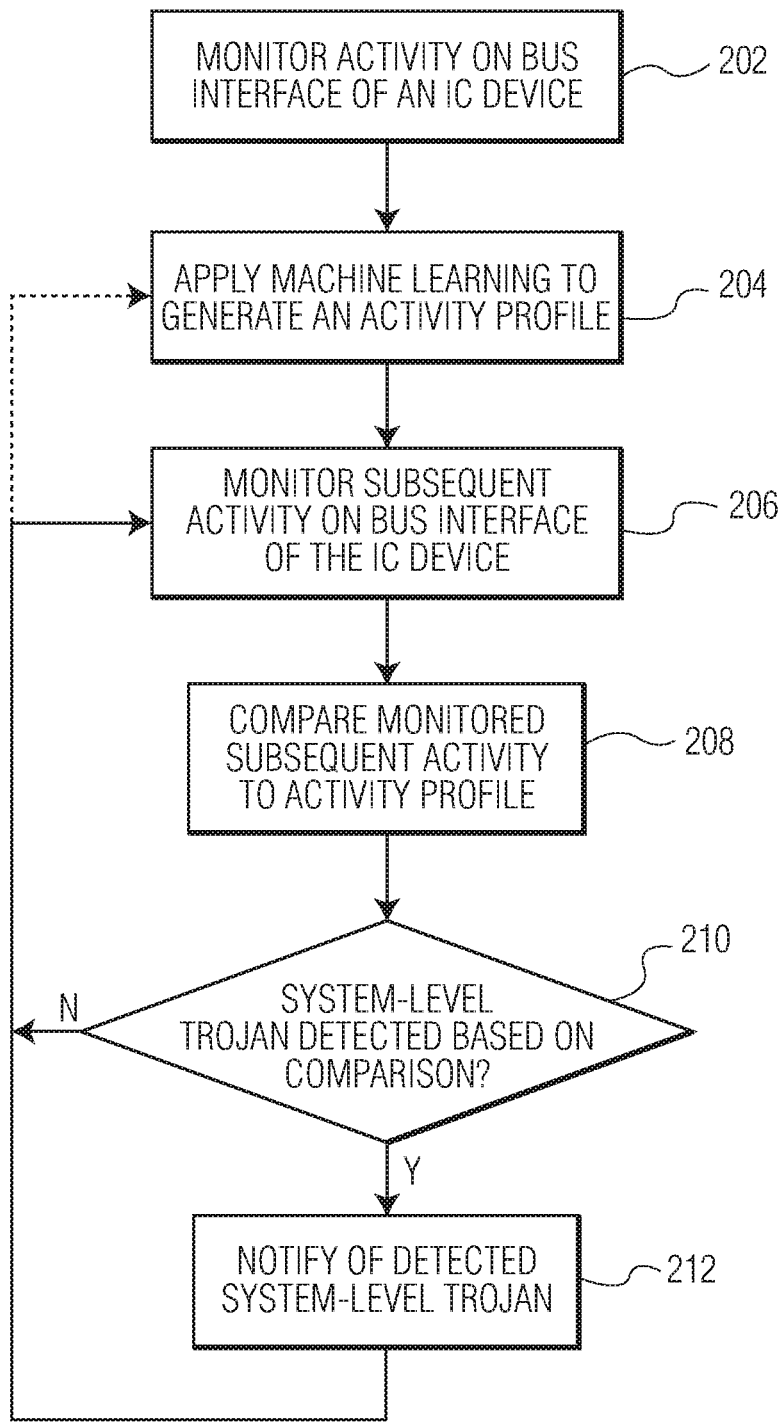
FIG. 2 is a process flow diagram of method for detecting a system-level Trojan on a system such as a PCB.

FIG. 2 is a process flow diagram of method for detecting a system-level Trojan on a system such as a PCB. At block 202, at an IC device of the system, activity on a bus interface of the IC device is monitored. At block 204, at the IC device, machine learning is applied to data corresponding to the monitored activity to generate an activity profile. In one embodiment, the activity profile may reflect activity at the bus interface that corresponds to a case where a system-level Trojan is not triggered (e.g., normal uncompromised operation) and in another embodiment, the activity profile may reflect activity at the bus interface that corresponds to a case where a system-level Trojan is triggered (e.g., compromised operation). At block 206, at the IC device, subsequent activity on the bus interface of the IC device is monitored. For example, the subsequent activity is post-deployment activity that occurs once the PCB is being used in the field for its intended purpose. At block 208, at the IC device, data corresponding to the subsequently monitored activity is compared to the machine learning generated activity profile to determine if a system-level Trojan is detected. When the activity profile corresponds to the case of a non-triggered Trojan (or the case where a Trojan is not even present), a match between the subsequently monitored activity and the activity profile may indicate that that a system-level Trojan is not present and/or has not been triggered. In the case where the activity profile corresponds to the case of a triggered Trojan, a match between the subsequently monitored activity and the activity profile may indicate that that a system-level Trojan is present and has been triggered. In response to the comparison, if it is determined at decision point 210 that a system-level Trojan is detected, then at block 212, a notification is generated. In an embodiment, the notification is transmitted off of the PCB to indicate the determination to an end-user and/or to some other system. If it is determined at decision point 210 that a system-level Trojan is not detected, then the process returns to block 206 for monitoring and/or to block 204 for machine learning.

Figure 3:
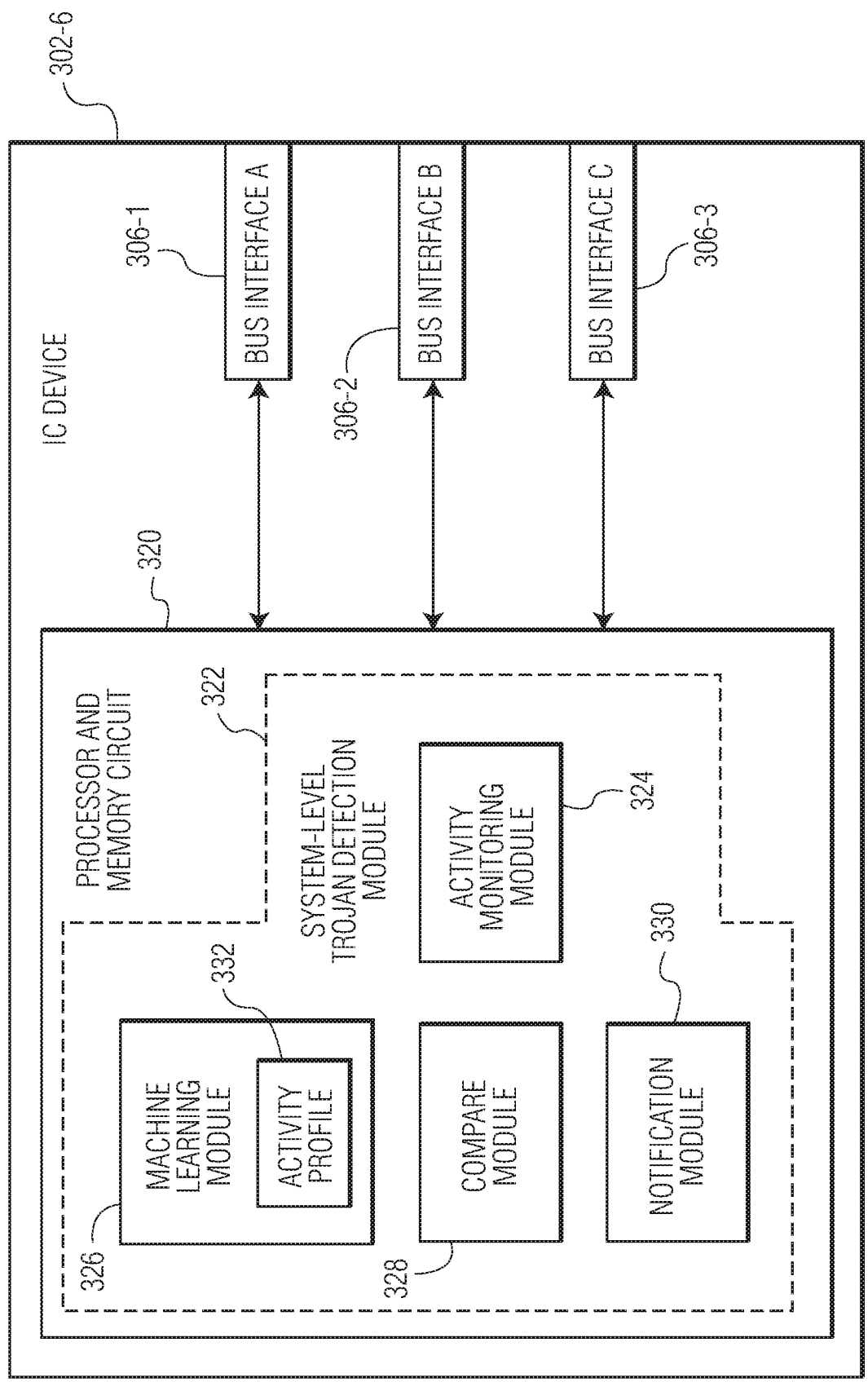
FIG. 3 is a functional block diagram of an IC device that is configured to detect a system-level Trojan.

In an embodiment, an IC device is configured to detect a system-level Trojan by implementing the techniques described herein. FIG. 3 is a functional block diagram of an IC device 306-6 that is configured to detect a system-level Trojan. As depicted in FIG. 3, the IC device includes a processor and memory circuit 320 and three bus interfaces 306-1, 306-2, and 306-3, bus interface A, bus interface B, and bus interface C, respectively. In an embodiment, the processor and memory circuit includes circuits that are configured for processing digital data and/or analog signals and the memory includes volatile and/or non-volatile memory that stores instructions and/or data that are used to implement system-level Trojan detection. Although the processor and memory circuit is shown as a single block in FIG. 3, the processor and memory circuit may be distributed contiguously and/or non-contiguously as circuit elements throughout the IC device. The bus interfaces may include, for example, an Ethernet bus interface, an SPI interface, and a JTAG interface although other types of interfaces are possible. Although the IC device depicted in FIG. 3 includes three bus interfaces, the IC device may include more or less than three bus interfaces but should include at least one bus interface. Additionally, it is not necessary that each bus interface of the IC device is a bus interface that is intended to be used once the IC device has been deployed into the field. For example, at least one bus interface may be used primarily or entirely for pre-deployment verification, validation, and/or testing and thus that particular bus interface may not be connected to a bus on a PCB once the IC device is attached to the PCB.

The IC device 302-6 depicted in FIG. 3 also includes a system-level Trojan detection module 322 that includes components configured to implement system-level Trojan detection in accordance with an embodiment of the invention. As depicted in FIG. 3, the system-level Trojan detection module is realized within the processor and memory circuit 320 and includes an activity monitoring module 324, a machine learning module 326, a compare module 328, and a notification module 330.

The activity monitoring module 324 of the system level-Trojan detection module 322 is configured to monitor activity on a bus interface 306-1-306-3 of the IC device 302-6. In an embodiment, the activity monitoring module can be configured to monitor activity on one or any combination of the bus interfaces. The activity that is monitored by the activity monitor may include activity related to the data transmitted on a bus of the PCB as monitored through a bus interface of the IC device. Parameters of monitored activity related to data on a bus may include latencies, e.g., time interval(s) between a data packet request and receipt of the requested data packet, lag times between input and output data streams, the sizes and/or addresses of packets transmitted from and/or received at the bus interface, and workload (e.g., the amount of time required to process a request received at the bus interface). In another embodiment, the activity that is monitored by the activity monitor may include activity related to access to dedicated memory IC devices such as random access memory (RAM) IC devices. Parameters of monitored activity related to memory IC device accesses may include time intervals between two accesses, differences in addresses of memories that are accessed, and differences in data read or written. In an embodiment, activity that is monitored may include, for each IC device on the PCB, data received, data transmitted, packet size information (e.g., minimum size, maximum size, average size, median size, standard deviation), ratio information (e.g., packets transmitted vs. packets received in terms of, for example, number of packets, number of bytes per packet, total number of bytes within a certain time interval), and the entropy of packets (e.g., the extent to which packets can be compressed using standard compression algorithms).

The machine learning module 326 of the system level-Trojan detection module 322 is configured to apply machine learning to data corresponding to the monitored activity to generate an activity profile 332. In an embodiment, the specific machine learning algorithms that are applied to the monitored data are dependent on the specific details of the function of the individual IC devices and the function of the PCB as a whole. Examples of machine learning algorithms that may be implemented by the machine learning module are described below. The activity profile or activity profiles may include, for example, a histogram of the time interval between two memory accesses, a histogram of the differences in addresses of memories that are accessed, and/or a histogram of the difference in data read or written. In other embodiments, an activity profile may include an indication of minimum activity on a bus interface, maximum activity on a bus interface, average activity on a bus interface, median activity on a bus interface, and/or a standard deviation of activity on a bus interface. In another embodiment, an activity profile may give an indication if certain parameters (e.g., size, latency, entropy of data packets) are Gaussian distributed. In an embodiment, the machine learning module may generate multiple different activity profiles that are stored on the IC device as an activity profile library.

The compare module 328 of the system level-Trojan detection module 322 is configured to compare data corresponding to the subsequently monitored activity to the machine learning generated activity profile to determine if a system-level Trojan is detected. In an embodiment, the compare module may compare a histogram of monitored traffic that is generated in the field to a histogram that was generated from pre-deployment learning.

The notification module 330 of the system level-Trojan detection module 322 is configured to generate a notification when it is determined from the comparison that at system-level Trojan has been detected. In an embodiment, the notification may be an indication of the likelihood of the presence of a system-level Trojan on a scale of, for example, extremely likely, likely, possible, to not likely. The notification may also be in the form of, for example, number scales, percentage scales, and graphical indicators (e.g., shapes and/or colors, etc.). In another embodiment, the notification may include a notification that no system-level Trojan was detected, for example, the notification may simply be binary, e.g., system-level Trojan detected/not detected. In an embodiment, the notification module coordinates the communication of the notification off of the PCB to notify another system and/or end-user of the detection of a system-level Trojan.

The components of the system-level Trojan detection module 322 are implemented on the IC device 302-6 in hardware, software, firmware, or combination thereof. For example, the system-level Trojan detection module is implemented in hardware, software, firmware, or combination thereof that is embodied in the processor and memory 320 of the IC device.

Communications between different IC devices in furtherance of the malicious activity of a system-level Trojan happen via the buses on a PCB such as the Ethernet, SPI, and/or JTAG buses 104-1-104-3 of the PCB 100 depicted in FIG. 1. However, the communications that are made in furtherance of the malicious activity of the system-level Trojan are mixed with the other communications that occur between the IC devices on the PCB in the course of conducting the operations for which the PCB was designed. Because cooperation between IC devices is fundamental to a system-level Trojan, a detection mechanism in accordance with an embodiment of the invention involves monitoring such IC-to-IC communications. Various techniques for implementing such a detection mechanism are described below.

Machine Learning Mechanisms

As indicated above, machine learning (e.g., on-device machine learning) is a component of the technique for detecting system-level Trojans. In an embodiment, the machine learning described herein focuses on identifying differences in monitored bus activity before a system-level Trojan is activated/triggered and after the system-level Trojan is activated/triggered to generate an activity profile that can be used to identify a system-level Trojan. For example, the machine learning may involve heuristic behavior analysis of monitored bus activity before a system-level Trojan is activated and after the system-level Trojan is activated. Once differences in monitored bus activity are identified, an activity profile can be generated and comparisons of the identified differences to actual monitored traffic can be used to identify system-level Trojans.

Machine learning can take place at different stages in the PCB lifecycle including before the PCB is deployed into the field (referred to generally as a "pre-deployment" stage) and/or after the PCB is deployed into the field (referred to generally as a "post-deployment" stage). In an embodiment, pre-deployment machine learning may involve machine learning during PCB verification, validation, and/or testing and post-deployment machine learning may involve machine learning while the PCB is implementing its intended functions, e.g., while the PCB is being used in the field in an end product. In an embodiment, post-deployment is any time after the PCB is assembled and shipped to an entity that eventually integrates the PCB into a commercial product, which is then sold by the product manufacturer and put into use by the purchaser. An example of pre-deployment and post-deployment is described for a PCB that is to be installed in, for example, communications equipment such as a router. Pre-deployment may involve all activities in the supply chain up until the manufacturer/seller of the PCB sells the PCB to a customer that manufactures and sells routers to customers. Post-deployment may involve all activities that occur once the PCB has been sold to the router manufacturer/seller, including activities that occur once the router has been sold to an end user and installed into a communications network by the customer for use in implementing the intended functions, e.g., routing data packets through the communications network. In another example, the demarcation between pre-deployment and post-deployment is when the PCB begins to be used for its intended purpose. In another example, the demarcation between pre-deployment and post-deployment is when the PCB leaves a controlled environment and is used in an uncontrolled environment. Although examples of pre-deployment and post-deployment are provided, it should be readily apparent that many other examples of pre-deployment and post-deployment scenarios exist.

Pre-Deployment Machine Learning

In an embodiment, pre-deployment machine learning is implemented and involves machine learning that takes place before the PCB has been deployed for its intended purpose. Pre-deployment machine learning typically takes place in a controlled environment such as in the controlled environment of a PCB assembly facility. Machine learning during pre-deployment may be desirable for at least a couple of reasons. For example, pre-deployment machine learning is desirable because the machine learning may take place before a system-level Trojan has been triggered, thus enabling the generation of baseline activity profiles. Additionally, pre-deployment machine learning that takes place in a controlled environment allows machine learning conditions to be predictable and repeatable.

In an embodiment, pre-deployment machine learning involves implementing machine learning during PCB validation. Pre-deployment machine learning during validation, e.g., in a controlled environment such as a PCB assembly facility, may provide several advantages, including: repeatable conditions to carry out different machine learning runs under different, slightly modified conditions, but also the possibility that the detection mechanism can also be active, creating its own traffic on the PCB bus and observing the reaction of different IC devices. In an embodiment, pre-deployment machine learning during validation involves actively creating traffic on the bus of the PCB, modifying traffic on the bus of the PCB, and/or disturbing traffic on the bus of the PCB.

In an embodiment, pre-deployment machine learning during validation involves replaying data streams on a bus of the PCB, using original captured data streams and/or captured data streams that have been modified for a particular purpose. In either case, pre-deployment machine learning involves evaluating the data to determine if there are significant differences in the responses of the IC devices on the PCB when receiving modified or unmodified replayed data streams. For example, replayed data can be grouped such that if it is desirable to examine a combination of two different messages, either of the two different messages can be modified separately and the two different messages can be replayed, either in the original order or reverse order, in order to examine how the other IC devices react to the respective modifications.

In an embodiment, pre-deployment machine learning during validation involves performing netlist-based simulations, using off-chip simulation resources. Depending on the IC devices on the PCB (e.g., third-party IC devices with an unknown netlist or IC devices with a known netlist), the simulation can be based on the netlists of one or more IC devices and/or on the netlist of the PCB. The netlist used for simulation can be complemented by the netlist of parts of an assumed system-level Trojan, e.g., a system-level Trojan that is known to exist and, for example, can be found in a known database of Trojans. In an embodiment, a simulation can be run that compares communications on the PCB before a system-level Trojan is triggered versus communications on the PCB after the system-level Trojan is triggered.

In an embodiment, pre-deployment machine learning during validation involves accessing off-chip calculation capacity in a controlled environment. For example, several types of statistical analysis can be done on the data communicated on the bus of the PCB. The results can be used to generate an activity profile or a library of activity profiles that can be used to identify system-level Trojans.

Post-Deployment Machine Learning

In an embodiment, post-deployment machine learning is implemented for use in the generation of activity profiles that are used to identify system-level Trojans. Post-deployment machine learning typically involves "passive" monitoring of a bus interface (e.g., in listen-only mode) and may provide benefits that are different from pre-deployment machine learning. For example, some system-level Trojans are only triggered by rarely occurring states, which may occur only in post-deployment conditions and not under pre-deployment conditions (in which only trigger scenarios included in a validation plan are applied). Also, the regular system behavior and the data traffic on a bus of the PCB may be substantially different from what is assumed and used during pre-deployment validation depending on the actual end use. A PCB manufacturer may not be sure if the PCB in a controlled environment such as a lab is the same as the PCB that is delivered to customers for deployment in the field. For example, malicious PCB manufacturers could open their own sales channels, producing PCBs that have been compromised for their own sales channels and uncompromised PCBs for the official sales channels, so that a PCB used for pre-deployment validation is an official, uncompromised PCB, e.g., a PCB that is not compromised with a system-level Trojan.

Detailed Description of Pre-Deployment and Post-Deployment Machine Learning

Even though state-of-the-art machine learning algorithms can achieve good results in an unsupervised self-learning mode, such a self-learning phase can require a large volume of data. Hence, in an embodiment, the machine learning module is equipped with some assumptions on the behavior of the system in general and on the expected types of system-level Trojans, especially with respect to the differences between bus activity when a system-level Trojan is not triggered and the bus activity when a system-level Trojan is triggered. Some examples of assumptions that may be made and used in directing pre-deployment and/or post-deployment machine learning are described below.

System-Level Trojan Communication Via a JTAG Port

The JTAG port of an IC device is a known entry point for various types of attacks, e.g., loading unsigned code to "jail-break" a system such as a gaming console, stealing encryption keys, and performing memory forensics in the application mode. The JTAG port can also be used for intended system activities such as, for example, functional safety in the field or for reloading firmware. Hence, it is typically not feasible to block off the JTAG port from communication. In accordance with an embodiment of the invention, activity on the JTAG port of an IC device is monitored for use in pre-deployment and/or post deployment machine learning, the results of which are used to generate activity profiles that are used to identify system-level Trojans.

System-Level Trojan Detection via Boundary Scan Timing

A "boundary scan" is a known technique specified by JTAG for testing interconnects (wire lines) on a PCB. Boundary scans are also widely used as a debugging method to monitor pin states of IC devices, measure voltage, or analyze sub-blocks inside an IC device. In an embodiment, a boundary scan can be used to detect IC devices that may have been surreptitiously mounted on a PCB. For example, a boundary scan may reveal that an additional capacitive load from such an IC device has modified the timing of signals between the other IC devices on the PCB. In an embodiment, monitoring activity and monitoring subsequent activity on a bus interface of an IC device involves monitoring timing behavior of signals at the bus interface using boundary scan. For example, the monitoring involves measuring the propagation delay (e.g., travel time) of signals from one IC device to another IC device through a bus on the PCB, where the propagation delay is measurement is based on a boundary scan. In an embodiment, a machine learning technique involves supervising boundary scan timing and comparing the boundary scan timing against learned values to generate activity profiles that can be used to detect system-level Trojans.

System-Level Trojan Detection Via Port Scanning on Logical or Physical Ports

Port scanning involves scanning hosts for open ports, e.g., logical ports and/or physical ports. In an embodiment, port scanning may be used to monitor activity at an interface of an IC device. For example, port scanning may involve reading the addresses of incoming packets to see if the packets are addressed to a port (logical or physical) that is known to not exist on the IC devices on an uncompromised PCB. For example, detecting a packet that is addressed to a port that does not exist on the PCB may be an indication that the system is compromised and a system-level Trojan may be operating on the PCB. In another example, the system-level Trojan detection module may send out port scanning messages onto the PCB probing for ports that should not exist on the PCB, such that receiving a response from a port that should not exist is an indication of the presence of a Trojan. In another example, port scanning may be able to detect a surreptitiously added IC device by detecting an unknown port address. Port scanning may be conducted on a physical port basis and/or on a logical port basis.

In an embodiment, port scanning involves intentionally using a faulty protocol (e.g., false checksums) together with a port address of a port that is not used in IC devices on an uncompromised PCB, in order to challenge an IC device that is suspected of carrying a system-level Trojan. For example, a surreptitiously placed IC device or a compromised IC device on a PCB may react on the faulty protocol with a request to repeat the received faulty message.

Statistical Analysis of PCB Bus Data Packets

Whether the activity monitoring is related to pre-deployment machine learning or post-deployment machine learning, the data that is monitored and/or collected by the activity monitoring module may be statistically analyzed to, for example, generate an activity profile. In an embodiment, statistical analysis of a data stream that is monitored at an interface of an IC device on a PCB may include typical latencies of communications (e.g., time lag between an input to output data stream), typical packet sizes for each IC device, and typical workload, measured, for example, by the time an IC device needs to process a request. In another embodiment, statistical analysis of a data stream to generate an activity profile may involve aggregating data related to accessing a dedicated memory IC device (e.g., a RAM) into, for example, an activity profile in the form of a histogram showing the time interval between two accesses, a histogram showing the difference in addresses of memories that are accessed, and/or a histogram showing the difference in data read or written.

Assumed System-Level Trojan Payload Behavior

In an embodiment, certain assumptions are made about operations that will take place when a particular system-level Trojan is triggered. For example, system-level Trojans related to leaking secret data, crypto-currency mining, and ransoms (e.g., sabotaging a system until a ransom is paid) may have known and/or predictable activity patterns. Taking the assumptions about certain expected operations under consideration, certain activity profiles of communications can be developed and the activity at an interface of an IC device can be monitored to see if the monitored activity matches an activity profile.

Figure 4:
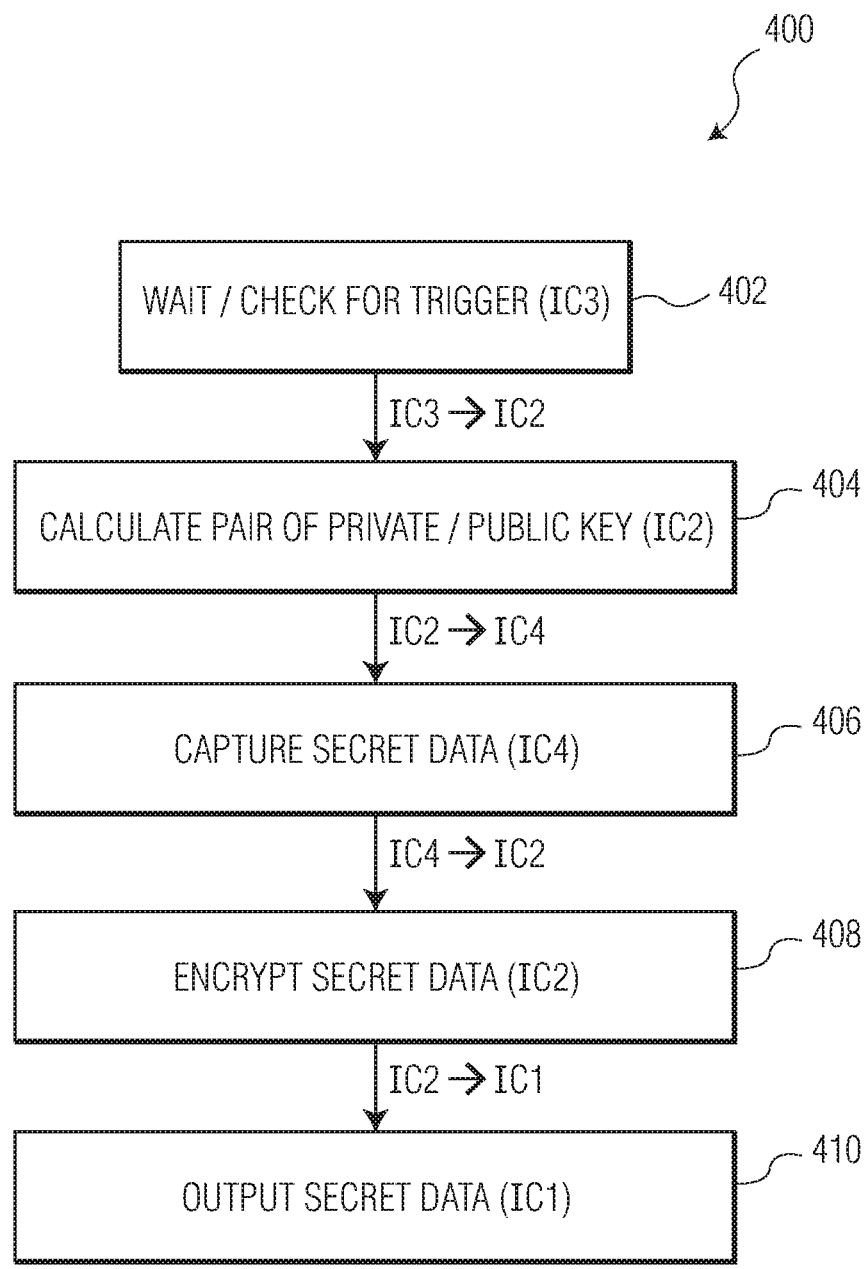
FIG. 4 depicts a process flow diagram that illustrates operations related to a system-level Trojan that leaks secret data from a system.

FIG. 4 depicts a process flow diagram 400 that illustrates operations related to a system-level Trojan that leaks secret data from a system. An understanding of the process flow can be used to generate an activity profile that may then be used for system-level Trojan detection. In FIG. 4, the references to IC devices (e.g., IC1-IC4) correspond to the IC devices 102-1-102-4 as described with reference to FIG. 1. At block 402, the third IC device (IC3) waits and/or checks for a trigger to store a private key. Once a trigger is detected, the third IC device (IC3) sends a message to the second IC device (IC2). At block 404, the second IC device (IC2) calculates a pair of private and public keys and key information is sent to the fourth IC device (IC4). At block 406, the fourth IC device captures the secret data (e.g., the private key) and sends a confirming message back to the second IC device (IC2). At block 408, the second IC device encrypts some secret data and sends the secret data to the first IC device (IC1). At block 410, the first IC device transmits (e.g., "leaks") the encrypted secret data out of the PCB. Given a known set of actions related to a system-level Trojan as illustrated in FIG. 4, an activity profile can be generated for such a system-level Trojan and traffic at an interface of an IC can be monitored for activity that matches the activity profile.

In an embodiment, assumed communications behaviors for different potential system-level Trojans can be utilized by a machine learning algorithm so that data traffic that may correspond to such a system-level Trojan can be identified. For example, assumptions about certain system-level Trojans can be specifically monitored and challenged in a controlled pre-deployment environment (e.g., by using replay of modified data traffic) and can be specifically monitored in post-deployment machine learning.

Assumed Trigger Mechanisms

The mechanisms by which system-level Trojans are triggered may vary widely. Some broad categories of trigger mechanisms include purely digital trigger mechanisms and partly analog trigger mechanisms. Purely digital mechanisms for triggering a system-level Trojan may include, for example, counting the run time of an application, counting elapsed time, and activation by rare events. Partly analog mechanisms for triggering a system-level Trojan may include monitoring a certain number of temperature cycles, monitoring a certain degree of aging, measuring a change in an IC device parameter. In an embodiment, knowledge of the trigger mechanism of system-level Trojans can be utilized by a machine learning algorithm such that activity corresponding to a system-level Trojan can be identified.

Netlist-Based Simulations

In an embodiment, pre-deployment machine learning involves conducting netlist-based simulations using emulated system-level Trojans. For example, pre-deployment machine learning can be implemented when netlist-based simulations are run with and without an emulated system-level Trojan being active. Differences in activity at the interface of an IC device between the simulations run with and without a system-level Trojan being active can be identified and used to generate activity profiles that correspond to particular system-level Trojans. Multiple different system-level Trojans can be simulated to generate activity profiles that are specific to the particular system-level Trojans. Additionally, the simulated system-level Trojans can be inserted into different places within the simulated netlists. In an embodiment, an emulated system-level Trojan may have any combination of the following properties: the emulated system-level Trojan switches from inactive to active to model the effect of triggering the system-level Trojan; the emulated system-level Trojan varies according to an assumed system-level Trojan payload; components of the emulated system-level Trojan are placed at different locations within the IC devices and/or in different IC devices on the PCB; and different types of emulated system-level Trojans and different payload algorithms may be used. In an embodiment, information obtained from netlist-based simulations can be utilized by a machine learning algorithm so that data traffic that may correspond to such a system-level Trojan can be identified.

Figure 5:
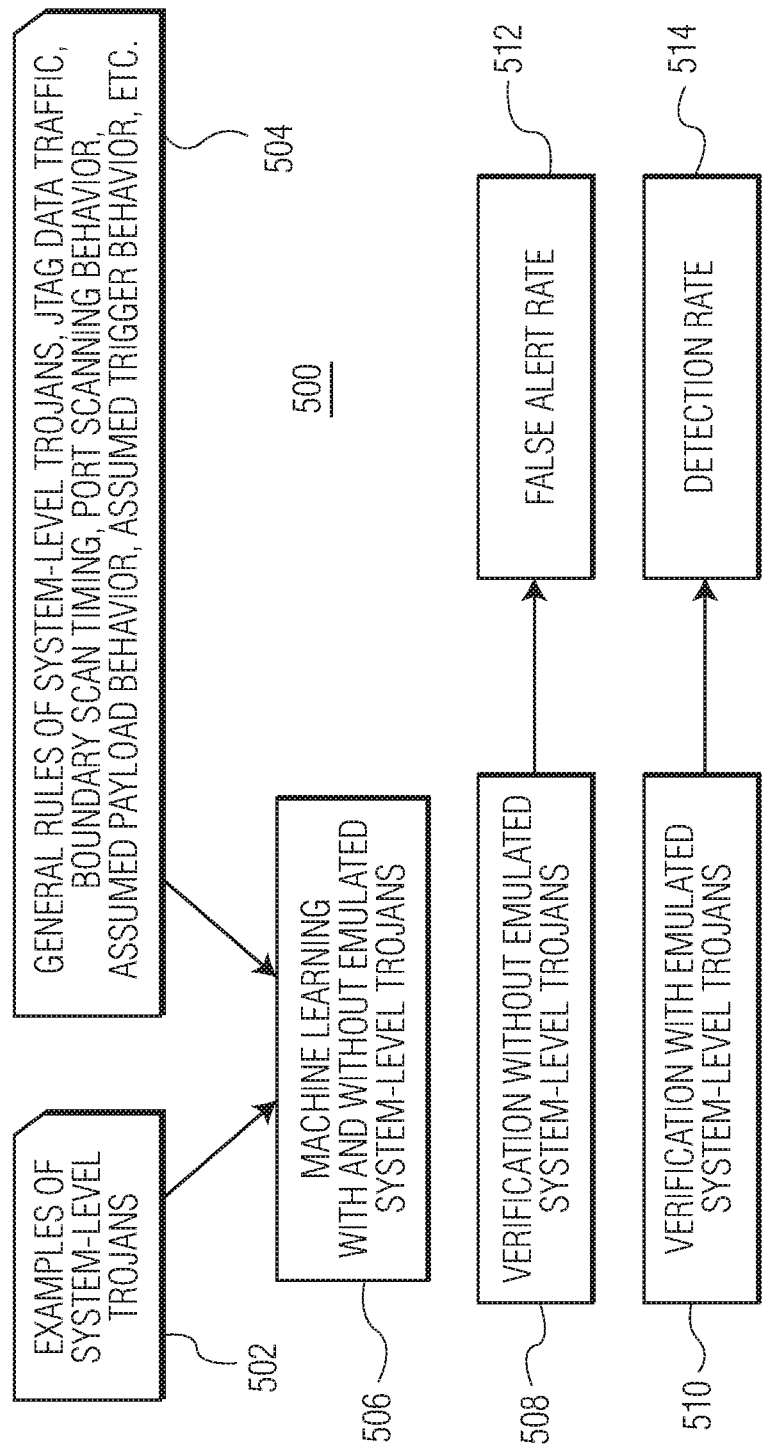
FIG. 5 is a graphical illustration of a process flow diagram 500 for pre-deployment machine learning that involves using netlist simulations.

FIG. 5 is a graphical illustration of a process flow diagram 500 for pre-deployment machine learning that involves using netlist simulations. At block 502, examples of system-level Trojans are provided to ("fed" into) a machine learning engine/function. At block 504, general rules for machine learning are provided to ("fed" into) the machine learning engine/function. For example, the general rules for machine learning may relate to known behavioral patterns of system-level Trojans, JTAG data traffic patterns, boundary scan timing, port scanning behavior, assumed payload behavior, and/or assumed trigger behavior. At block 506, machine learning is conducted for instances where an emulated system-level Trojan is active and for instances where the emulated system-level Trojan is not active and activity profiles are generated. At block 508, a netlist verification is performed without emulated system-level Trojans activated and at block 510, a netlist verification is performed with emulated system-level Trojans active. When verification is performed without emulated system-level Trojans being activated, at block 512, a false alert rate may be determined as any detection alerts are assumed to be incorrect, or "false alerts," since emulated system-level Trojans are not active. When verification is performed with emulated system-level Trojans active, at block 514, a detection rate may be determined as information about the emulated active system-level Trojans is known. Many of the above-described techniques for enhancing the machine learning process may be applied to netlist based simulations.

General Features of Machine Learning Algorithms

In an embodiment, pre-deployment and/or post-deployment machine learning may involve deep learning, which is part of a broader category of machine learning techniques that are based on artificial neural networks. In an embodiment, a deep learning algorithm usually starts with pre-processing/data reduction of huge amounts of data (e.g., identifying constant values, identifying constantly changing values). Deep learning algorithms typically utilize feature extraction, which may need human assistance to achieve acceptable speeds. In an embodiment, the feature extraction follows certain assumptions that are specific to system-level Trojans. In an embodiment, machine learning involves extracting features from the data collected by monitoring the bus interfaces.

Combining Results of Pre-Deployment and Post-Deployment Machine Learning

Figure 6:
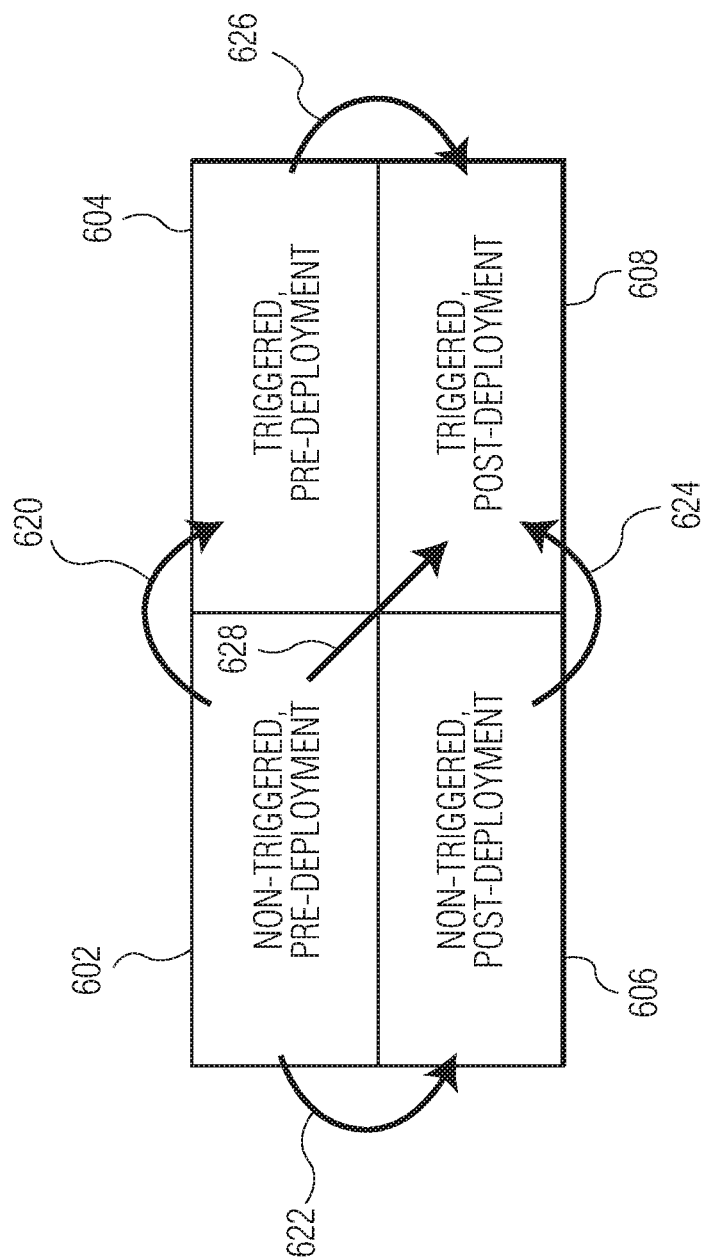
FIG. 6 graphically illustrates different operational boundaries across which machine learning can be applied to generate activity profiles for identifying system-level Trojans.

In an embodiment, a combination of pre-deployment machine learning and post-deployment machine learning is applied to generate activity profiles that are used to detect system-level Trojans. FIG. 6 graphically illustrates different operational boundaries across which machine learning can be applied to generate activity profiles for identifying system-level Trojans. The graphic of FIG. 6 includes four quadrants of operations, including; 1) a pre-deployment stage, system-level Trojan not triggered 602, 2) a pre-deployment stage, system-level Trojan triggered 604, 3) a post-deployment stage, system-level Trojan not triggered 606, and 4) a post-deployment stage, system-level Trojan triggered 608. The graphic also illustrates machine learning operations that can be implemented across the different operational boundaries.

As shown in FIG. 6, arrow 620 illustrates machine learning to identify activity profiles of system-level Trojans that can be implemented between the pre-deployment stage, system-level Trojan not triggered and the pre-deployment stage, system-level Trojan triggered. With respect to the machine learning represented by arrow 620, machine learning can be used to distinguish monitored activity in the case where a system-level Trojan is triggered in a pre-deployment stage from monitored activity in the case where the system-level Trojan is not triggered in the pre-deployment stage.

Arrow 622 illustrates machine learning to identify activity profiles of monitored activity at an interface of an IC device between the pre-deployment stage, system-level Trojan not triggered and the post-deployment stage, system-level Trojan not triggered. That is, arrow 622 may represent a comparison of controlled pre-deployment conditions to uncontrolled post-deployment conditions when a system-level Trojan has not been triggered (e.g., is lying dormant). Such machine learning may help to account for special conditions of the ecosystem in which the PCB is embedded, the use cases employed, and/or environmental conditions present during post-deployment operations (e.g., field operations) compared to pre-deployment operations (e.g., lab operations).

Arrow 624 illustrates machine learning to identify activity profiles of system-level Trojans that can be implemented between the post-deployment stage, system-level Trojan not triggered and the post-deployment stage, system-level Trojan triggered. With respect to the machine learning represented by arrow 624, machine learning can be used to extrapolate expected activity in the case where a system-level Trojan is triggered in the post-deployment stage from the actual monitored activity in the post-deployment stage where the system-level Trojan is not triggered. Typically, the activity that will be seen in the lower right quadrant (post-deployment stage, system-level Trojan triggered) is not known so machine learning is used to determine what the activity might look like.

Arrow 626 illustrates machine learning to identify activity profiles of system-level Trojans that can be implemented between the pre-deployment stage, system-level Trojan triggered and the post-deployment stage, system-level Trojan triggered. With respect to the machine learning represented by arrow 626, machine learning can be used to extrapolate expected activity in the case where a system-level Trojan is triggered in the pre-deployment stage from the actual monitored activity in the post-deployment stage where the system-level Trojan is triggered. Typically, the activity that will be seen in the lower right quadrant (post-deployment stage, system-level Trojan triggered) is not known so machine learning is used to figure out what the activity might look like.

As indicated above, the activity that will be seen in the lower right quadrant (post-deployment stage, system-level Trojan triggered) is typically not known. Thus, the machine learning should be adapted to learn what the activity will look like in the post-deployment stage, with the system-level Trojan triggered. For example, it is desirable to be able to generate activity profiles that correspond to the lower right quadrant (post-deployment stage, system-level Trojan triggered) using the information learned in the processes represented by arrows 620 and 622 and using the information learned in the processes represented by arrows 624 and 626. This operation is illustrated by arrow 628.

Verification of the Detection Coverage

In an embodiment, results of pre-deployment machine learning, post-deployment machine learning, and combining of pre-deployment machine learning and the post-deployment machine learning is verified. For example, an assessment is made as to what percentage of assumed different system-level Trojans can be detected. In an embodiment, the verification is implemented based on netlist simulations. For example, in one embodiment, a number of data sets are applied on a netlist without an emulated system-level Trojan being active to assess and, if necessary, adjust a false alert rate. In another embodiment, a number of data sets are applied on a netlist with an emulated system-level Trojan being active, but the applied emulated system-level Trojans are different from the emulated system-level Trojans that were used during training, and placed in different IC devices on the PCB, and at different locations in the IC devices' netlists, to assess the percentage of detected system-level Trojans.

There are publically available databases of known hardware Trojans. For example, a list of at least one-hundred known hardware Trojans can currently be found at www.trust-hub.org. At this time, there are around 1,000 different known hardware Trojans but the number of different hardware Trojans is expected to continue to grow. Additionally, such known hardware Trojans can manifest themselves as system-level Trojans in many different ways, e.g., distributed in different ways among the IC devices already existing on a PCB, implemented at different places in respective IC devices, and/or involving additional IC devices on a PCB. In an embodiment, a subset of the known hardware and/or system-level Trojans are fed into the machine learning process for use in generating activity profiles that can be used to detect system-level Trojans.

Sensitivity Adjustment

Because the exact nature of a system-level Trojan may not be known, the "detection" of a system-level Trojan may actually be an indication of a likelihood of detection of a system-level Trojan. For example, the detection of a system-level Trojan may be an indication of the likelihood of the presence of a system-level Trojan on a scale of, for example, extremely likely, likely, possible, to not likely. Other degrees of likelihood may also be possible including number scales, percentage scales, and graphical indicators (e.g., shapes and/or colors, etc.). In another embodiment, the detection may simply be binary, e.g., system-level Trojan detected/not detected. In another embodiment, the detection decision may be based on a detection threshold, e.g., applying a detection threshold to an output of the comparison between monitored activity and an activity profile. For example, a decision is made that a system-level Trojan has been detected when it is determined from the comparison that there is at least a 50% likelihood that the system-level Trojan is present (e.g., in a very cautious system), at least a 90% likelihood that the system-level Trojan is present (e.g., in a standard system), or at least a 99% likelihood that the system-level Trojan is present (e.g., in a lab environment where the presence of the system-level Trojan is known and the goal is to avoid false detections and/or false alerts). In such a configuration, the detection threshold can be adjusted to meet a specific level of confidence, e.g., in terms of an acceptable false alert rate.

Implementation of the System-Level Trojan Detection Module on an IC Device

The specifics of how a system-level Trojan detection module is implemented on an IC device are depended on factors such as specific details of the IC device and/or the PCB on which the IC device is mounted. For example, an algorithm for observing activity on an interface to a bus of the PCB may run on an internal processor unit of the IC device. In an embodiment, data gathered from pre-deployment machine learning may, for example, be stored on-chip in read only memory (ROM) of the processor unit and data gathered from post-deployment machine learning may, for example, be stored in on-chip non-volatile memory (NVM). In an embodiment, post-deployment machine learning and combining pre-deployment machine learning and post-deployment machine learning may be implemented on an IC device during periods of low or no activity on the IC device and/or low or no activity on the bus and corresponding bus interface.

In an embodiment, the techniques for detecting system-level Trojans as described herein may be applicable to security-critical systems such as security-critical systems used in automotive, medical, and/or aerospace applications. The techniques described herein are also applicable when a defense against system-level Trojans is part of the system specification. In an embodiment, a notification of detection of a system-level Trojan can be used by a security-critical system to take some countermeasures to mitigate or prevent some malicious activity.

In an embodiment, the IC devices are attached on to a single PCB and in other embodiments, the IC devices are attached to multiple PCBs that are attached to each other with the IC devices connected by one or more buses.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store computer readable instructions and/or a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A circuit board comprising:
a bus;
multiple integrated circuit (IC) devices attached to the circuit board and electrically connected to the bus;
wherein a first IC device of the multiple IC devices attached to the circuit board includes a processor and memory circuit that stores computer readable instructions, which when executed by the processor and memory circuit, implements:
monitoring activity on a bus interface of the first IC device, wherein the bus interface is connected to the bus, and wherein the monitored activity involves activity on the bus interface that is received on the bus from at least one other IC device of the multiple IC devices that is attached to the circuit board and electrically connected to the bus;
applying machine learning to data corresponding to the monitored activity to generate an activity profile;
monitoring subsequent activity on the bus interface of the first IC device;
comparing data corresponding to the subsequently monitored activity to the machine learning generated activity profile to determine if a system-level Trojan is detected, wherein functionality required to enable the system-level Trojan is distributed over more than one of the multiple IC devices attached to the circuit board; and
generating a notification when it is determined from the comparison that at system-level Trojan has been detected.

2. The circuit board of claim 1, wherein monitoring activity and monitoring subsequent activity on the bus interface of the first IC device involves the first IC device monitoring timing behavior of signals at the bus interface.

3. The circuit board of claim 1, wherein monitoring activity and monitoring subsequent activity on the bus interface of the first IC device involves the first IC device port scanning on at least one of a logical port and a physical port of the first IC device.

4. The circuit board of claim 1, further comprising the first IC device applying statistical analysis to the data corresponding to the monitored activity and to the data corresponding to the subsequently monitored activity.

5. The circuit board of claim 4, wherein the statistical analysis involves generating a histogram.

6. The circuit board of claim 1, wherein determining if a system-level Trojan has been detected involves the first IC device applying a detection threshold to an output of the comparison.

7. An apparatus comprising:
a circuit board;
multiple integrated circuit (IC) devices attached to the circuit board and electrically connected by a bus;
wherein a first IC device of the multiple IC devices includes a processor and memory circuit that stores computer readable instructions, which when executed by the processor and memory circuit, implements:
monitoring activity on a bus interface of the first IC device, wherein the bus interface is connected to the bus, and wherein the monitored activity involves activity on the bus interface that is received on the bus from at least one other IC device of the multiple IC devices that is attached to the circuit board and electrically connected to the bus;
applying machine learning to data corresponding to the monitored activity to generate an activity profile;

monitoring subsequent activity on the bus interface of the first IC device;

comparing data corresponding to the subsequently monitored activity to the machine learning generated activity profile to determine if a system-level Trojan is detected, wherein functionality required to enable the system-level Trojan is distributed over more than one of the multiple IC devices attached to the circuit board; and generating a notification when it is determined from the comparison that at system-level Trojan has been detected.

8. The apparatus of claim 7, wherein monitoring activity and monitoring subsequent activity on the bus interface of the first IC device involves the first IC device monitoring timing behavior of signals at the bus interface.

9. The apparatus of claim 7, wherein monitoring activity and monitoring subsequent activity on the bus interface of the first IC device involves the first IC device port scanning on at least one of a logical port and a physical port of the first IC device.

10. The apparatus of claim 7, further comprising the first IC device applying statistical analysis to the data corresponding to the monitored activity and to the data corresponding to the subsequently monitored activity.

11. The apparatus of claim 10, wherein the statistical analysis involves generating a histogram.

12. The apparatus of claim 7, wherein determining if a system-level Trojan has been detected involves the first IC device applying a detection threshold to an output of the comparison.

\* \* \* \* \*